United States Patent [19]

Kimura

[11] Patent Number: 4,733,224

[45] Date of Patent: Mar. 22, 1988

[54] DETECTOR SYSTEM WITH MULTIPLE SENSORS EACH SENSING DIFFERENT DANGER CONDITIONS

[75] Inventor: Tetsuo Kimura, Tokyo, Japan

[73] Assignee: Nittan Co., Ltd., Tokyo, Japan

[21] Appl. No.: 933,127

[22] Filed: Nov. 21, 1986

[30] Foreign Application Priority Data

Nov. 21, 1985 [JP] Japan .................................. 60-259768

[51] Int. Cl.$^4$ ............................................. G08B 19/00
[52] U.S. Cl. ..................................... 340/521; 340/505;
340/512; 340/513; 340/518; 340/825.07
[58] Field of Search ............... 340/521, 505, 514, 518,
340/825.06–825.1, 502, 825, 54, 511, 512, 513, 517

[56] References Cited

U.S. PATENT DOCUMENTS

| | | | |
|---|---|---|---|
| 4,468,664 | 8/1984 | Galvin et al. | 340/505 |
| 4,555,695 | 11/1985 | Machida et al. | 340/505 |
| 4,581,604 | 4/1986 | Kimura et al. | 340/505 |
| 4,613,848 | 9/1986 | Watkins | 340/505 |
| 4,618,853 | 10/1986 | Yuchi | 340/505 |

Primary Examiner—Donnie L. Crosland
Attorney, Agent, or Firm—Hill, Van Santen, Steadman & Simpson

[57] ABSTRACT

A detector system having multiple sensors, each sensor detecting a different danger condition, has an address comparator for determining whether an access address coincident with a selected address is present in an access signal received from a central monitoring unit. The detector exchanges an information signal with the central monitoring unit using the coincidence detection signal of the address comparator. Success coincidence detection signals, corresponding to successively selected addresses being present in the access signal, are counted by a counter. If the detector has two sensors, the counter may be a D flip-flop circuit, and if the detector has more than two sensors, the counter may be a ring counter. The counter generates a signal for operating respective analog switches connected to the outputs of each sensor so as to successively through-connect the output of one sensor to the output of the detector system for transmittal to the central monitoring unit.

12 Claims, 2 Drawing Figures

DETECTOR SYSTEM WITH MULTIPLE SENSORS EACH SENSING DIFFERENT DANGER CONDITIONS

BACKGROUND OF THE INVENTION

1. Field of the Invention

The present invention relates to a combined detector having a plurality of sensors for respectively detecting different danger-identifying signals in a fire alarm system or the like.

2. Description of the Prior Art

Various conventional sensors are known to monitor environmental changes. For example, an ionization type smoke detector, a photoelectric smoke detector, a heat detector, and a flame detector have been used in a fire alarm system; a gas leakage detector or the like, in a gas leakage alarm system; and an ultrasonic detector or the like, in a burglar alarm system. Conventionally, these detectors generate outputs only when detection outputs are required. However, a so-called analog detector has recently been used to improve reliability of the system as a whole. This system constantly monitors a detection output so as to compensate for a failure of the detector and deterioration over time.

Various systems are also known which obtain installation position signals of individual detectors at a central monitoring unit so as to obtain more precise information. With the recent development of microcomputers, specific addresses are assigned to individual detectors so as to obtain detection outputs of the respective detectors by a sampling system through a common transmission line from a central monitoring unit. Japanese Utility Model Disclosure No. 59-178794 (Nov. 29, 1984) describes an analog detector using sampling system including both of the above techniques as shown in FIG. 2 herein. More specifically, a transmission circuit TM in a detector to converts an address signal which is supplied from a central monitoring system through a transmission line 1 by a sampling system into a format compatible with an address comparator AC. The address comparator AC detects whether an accessed address coinciding with an address set by an address setter AS is present. The address comparator AC supplies an address coincidence signal as an output when the addresses coincide with each other. The address coincide signal is supplied to an analog/digital converter AD and a switching transistor Tr and drives those elements. When the switching transistor Tr is driven, an ionization smoke detector I is operated and a voltage signal corresponding to the concentration of smoke present in an external ion chamber Io is generated. The voltage signal is supplied to the A/D converter AD and converted into a digital signal and then supplied to the transmission line 1 through the transmission circuit TM. At the central monitoring unit, necessary information of designated detectors can be obtained by the address supplied in advance and the signal received in response to the address through the transmission line 1.

A problem exists when a transmission system of an analog detector in the sampling system described above is used without modification to a combined detector having a plurality of sensors in a single sensor device. In order to obtain information of all sensors in a combined detector connected to a transmission line, the information transmission time per sensor and the sampling cycle are prolonged. Therefore, the access interval of each detector is prolonged and quick information acquisition as a main object of the monitoring system cannot be achieved.

SUMMARY OF THE INVENTION

It is an object of the present invention to provide a combined detector wherein a plurality of sensors can be connected to a central monitoring unit without prolonging the sampling cycle and quick information acquisition can be undertaken.

It is another object of the present invention to provide a combined detector wherein a central monitoring unit can easily and accurately discriminate which sensor generates a detection output signal.

In accordance with the principles of the present invention, there is provided a combined detector having at least a plurality of sensors and address coincidence detection means for detecting whether an access address coincident with an address given thereto is present in an access signal from a central monitoring unit, the combined detector being adapted to exchange an information signal with a CMU using a coincidence detection means, and having count means for counting the coincidence detection signal and a plurality of switching means each provided at an output terminal of each of the sensors, the switching means being selectively switched using a count output of the count means.

DESCRIPTION OF THE PREFERRED EMBODIMENTS

Figure 1:
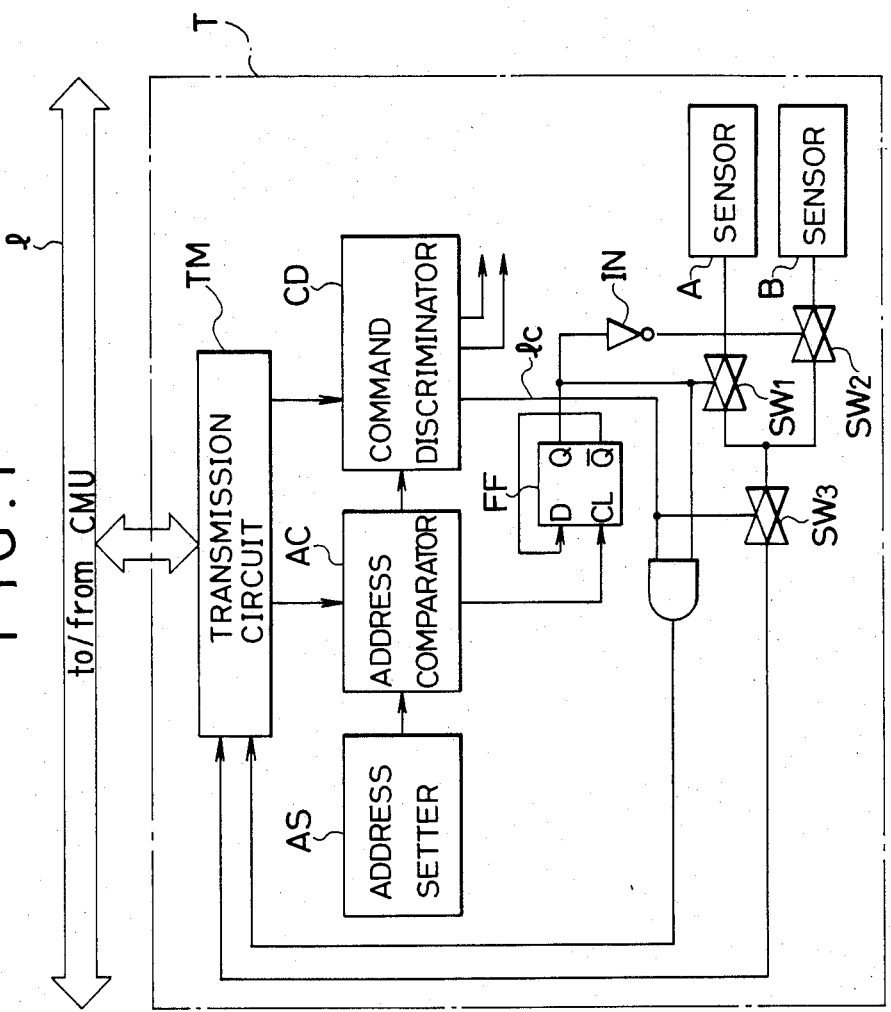
FIG. 1 is a block diagram showing a circuit configuration of a main portion in an embodiment of a combined detector according to the present invention.
Figure 2:
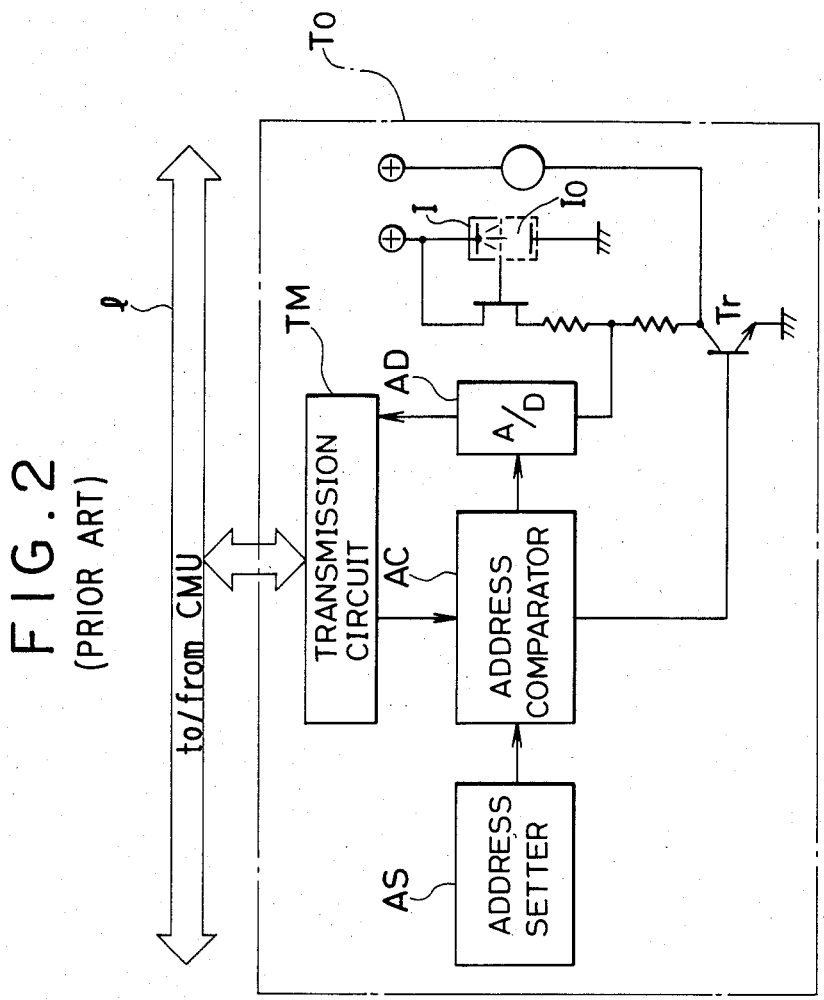
FIG. 2 is a block diagram showing a circuit configuration of a conventional detector having an ionization smoke detector as a detector.

FIG. 1 is a block diagram showing a circuit configuration of a main portion in an embodiment of a combined detector according to the present invention. This embodiment exemplifies a single combined detector T having two sensors, however, it is apparent that the combined detector according to the present invention may have three or more sensors. In this case, a counting means (to be described later) requires an arrangement different from that of this embodiment.

As in the conventional example described above, a transmission circuit TM in a detector T converts an address signal supplied from a central monitoring unit (not shown) through a transmission line 1 by a sampling system into a format compatible with an address comparator AC. In addition, the transmission circuit TM coverts various command signals following the address signal into formats compatible with a command discriminator CD. The address comparator AC detects whether an access address coincides with an address set by an address setter AS. When a coincidence between the addresses occurs, the address comparator AC generates an address coincidence signal as an output. The address coincidence signal is supplied to a clock terminal CL of a D flip-flop circuit FF, serving as a means for counting the address coincidence signal, and to the command discriminator CD. Upon reception of the address coincidence signal, if the inverting output terminal $\overline{Q}$ of the D flip-flop circuit FF is set at logic "1", its output terminal Q goes to logic "1". The command discriminator CD discriminates that the command signal supplied thereto is a data acquisition instruction and supplies a driven signal to a corresponding output line 1c. Analog switches $SW_1$ and $SW_2$ serving as a switching means are respectively connected to output terminals of two sensors A and B. A signal from output terminal Q of the D flip-flop circuit FF is supplied to a control terminal of the analog switch $SW_1$, which is connected to the output terminal of the sensor A. An inverted signal of the signal from output terminal Q of the D flip-flop circuit FF is supplied through an inverter IN to a control terminal of the analog switch $SW_2$, which is connected to the output terminal of the sensor B. The output terminals of the analog switches $SW_1$ and $SW_2$ are commonly connected. The common node of the analog switches $SW_1$ and $SW_2$ is connected to an analog switch $SW_3$. The control terminal of the analog switch $SW_3$ is connected to the output line 1 of the command discriminator CD. As described above, a switching means is provided at the output terminals of the sensors A and B. When the output terminal Q of the D flip-flop circuit FF is set at logic "1", the analog switch $SW_1$ connected the output terminal of the sensor A is closed to transfer the detection output of the sensor A, and the analog switch $SW_2$ connected to the output terminal of the sensor B is open to block the detection output on the sensor B. The analog switch $SW_3$ is closed by the drive signal from the command discriminator CD to supply the detection output of the sensor A to the transmission circuit TM. The transmission circuit TM converts the detection output of the sensor into a predetermined signal format. The converted signal is sent onto the transmission line 1.

When one sampling cycle is completed and the detector T is accessed again, the address comparator AC generates an address coincidence signal. The address coincidence signal is supplied to the clock terminal CL of the D flip-flop circuit and to the command discriminator CD. The output terminal Q of the D flip-flop circuit FF then goes to logic "0", the analog switch $SW_1$ connected to the output terminal of the sensor A is opened to block the detection output of the sensor A, and the analog switch $SW_2$ connected to the output terminal of the sensor B is closed to transfer the detection output of the sensor B. The analog switch $SW_3$ is closed by the drive signal from the command discriminator CD to supply the detection output of the sensor B to the transmission circuit TM. The output is converted into a predetermined signal format and then sent onto the transmission line 1.

As described above, when a sensor which has sent a detection output is specified at a given timing, the number of access cycles from the given timing can be monitored. Therefore, a CMU can determine the sensor currently generating a detection output. However, the currently operated sensor sometimes cannot be accurately monitored due to transmission errors or the like. This determination method is therefore not reliable.

In order to improve reliability, a level signal of the output terminal Q if the D flip-flop circuit FF as a count means is also sent to the CMU through the transmission circuit TM. The CMU refers to the detection output signal and the level signal and thus discriminates which sensor has generated the received detection output. In this embodiment, an AND signal of the level signal of the output terminal of the D flip-flop circuit FF and the drive signal of the command discriminator CD is obtained when the level signal is supplied to the transmissiom circuit TM for the following reason. Command signals sent from the CMU include many other instructions in addition to the data acquisition instructions as an objective of the present invention. The AND signal is required to establish the compatibility of the data acquisiton instruction and the many other instructions.

The above embodiment exemplifies a single combined detector T having two sensors, however, the combined detector T may have three or more sensors using a count means such as a ring counter. This is achieved by connecting each output terminal of the ring counter to control terminals of switching means provided at each output terminal of each sensor.

An analog switch as a switching means is used in the above embodiment. This is because the analog switch can transfer an analog amount of a detection output of a sensor and can follow the high response speed of a sampling system. It is apparent to those skilled in the art that other available means can be adopted.

In the above embodiment, the selection of sensors is in synchronism with a sampling cycle. However, when it is necessary to selectively sample the sensor of a specific detector urgently, the sensor can quickly be sampled by changing the address order to be accessed and by continuously accessing the specific detector without waiting for the next access by normal sampling.

As described above, a combined detector according to the present invention comprises a count means for counting a coincidence detection signal of an address coincidence detection means, and a plurality of switching means each provided at each output terminal of each sensor, wherein the switching means are selectively switching by a count output of the count means, thereby connecting a plurality of sensors to the detector without changing the polling cycle and obtaining various information while performing quick information acquisition.

In addition, since an information signal showing a count output situation of the count means is added to an information signal which is sent back to the CMU, the CMU refers both a detection output signal and the information signal indicating a count output and can discriminate which sensor has generated the detection output easily and accurately, thereby improving reliability.

Although modifications and changes may be suggested by those skilled in the art it is the intention of the inventor to embody within the patent warranted hereon all changes and modifications as reasonably and properly come within the scope of his contribution to the art.

I claim as my invention:

1. In a combined detector for use with a central monitoring unit, said detector having a plurality of sensors and address coincidence detection means for detecting whether an access address coincident with a selected address is present in an access signal from said central monitoring unit, the combined detector being adapted to exchange an information signal with said central monitoring unit using a coincidence detection signal of the address coincidence detection means, the improvement comprising count means having a count output for counting successive coincidence detection signals and a plurality of switching means respectively connected to an output terminal of each of said sensors, said switching means each having a control input connected to said count output and being selectively switched using a count output of said count means to successively through-connect the output of one sensor to said central monitoring unit.

2. A combined detector according to claim 1, wherein said switching means is an analog switch.

3. A combined detector according to claim 1, wherein said count means is a D flip-flop circuit.

4. A combined detector according to claim 1, wherein said count means is a ring counter.

5. In a combined detector for use with a central monitoring unit, said detector having a plurality of sensors and address coincidence detection means for detecting whether an access address coincident with a selected address is present in an access signal from said central monitoring unit, the combined detector being adapted to exchange an information signal with said central monitoring unit using a coincidence detection signal of the address coincidence detection means, the improvement comprising count means having a count output for counting successive conicidence detection signals and a plurality of switching means respectively connected to an output terminal of each of said sensors, said switching means each having a control input connected to said count output and being selectively switched by said count output of said count means to successively through-connect the output of one sensor to said central monitoring unit, and means for sending a signal indicating the count output of said count means to said central monitoring unit with said one sensor output.

6. A combined detector according to claim 5, wherein each of said switching means is an analog switch.

7. A combined detector according to claim 5, wherein said count means is a D flip-flop circuit.

8. A combined detector according to claim 5, wherein said count means is a ring counter.

9. A combined detector according to claim 5, wherein said means for sending a signal indicating the count output includes a command discriminator having an output at which a signal is generated upon the occurrence of said coincidence detection signal, and an AND gate having first input connected to said output of said command discriminator and a second input connected to said count output and an output for supplying said signal to said central monitoring unit.

10. In a method for monitoring a plurality of different danger conditions using a like plurality of sensors for respectively detecting each danger condition and for supplying a signal to a central monitoring unit, the method including the steps of detecting whether an access address coincident with a selected address is present in an access signal from said central monitoring unit, generating a coincidence signal upon a determination of address coincidence, the improvement comprising the steps of:

counting successive coincidence signals in a counter; and using the count of said counter to control a plurality of switches respectively connected to each of said sensors for successively through-connecting one of said sensor outputs to said central monitoring unit.

11. A method according to claim 10, wherein the number of sensors is two and the number of switches is two, and wherein said counter is a D flip-flop, and wherein the step of using the output of said counter to control said switches is further defined by:

directly supplying the output of said flip-flop to one of said switches;

inverting the output of said flip-flop and supplying said inverted output to the other of said switches; and simultaneously closing one of said switches and opening the other of said switches upon successive changes of state of said flip-flop output.

12. A method according to claim 10, comprising the additional step of:

sending a signal indicating the count output of said counter to said central monitoring unit in combination with said one sensor output.

* * * * *